(12) United States Patent
Benini et al.

(10) Patent No.: US 6,704,878 B1
(45) Date of Patent: Mar. 9, 2004

(54) APPARATUS AND METHOD FOR IMPROVED PRECOMPUTATION TO MINIMIZE POWER DISSIPATION OF INTEGRATED CIRCUITS

(75) Inventors: Luca Benini, Palo Alto, CA (US); James Sproch, Saratoga, CA (US); Bernd Wurth, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 08/709,382

(22) Filed: Sep. 6, 1996

(51) Int. Cl.$^7$ .................................................. G06F 1/00
(52) U.S. Cl. ........................................ 713/321; 708/139
(58) Field of Search ................................ 364/133, 707, 364/736.05, 716.04, 709.09; 395/750.01–750.08

(56) References Cited

U.S. PATENT DOCUMENTS 5,530,841 A   6/1996  Gregory et al. ............. 395/500
5,673,200 A   9/1997  Toyonaga et al. ........... 364/490

OTHER PUBLICATIONS

Alidina, et al., "Precomputation–Based Sequential Logic Optimization for Low Power", Dec. 1994, IEEE Transactions on VLSI Systems, vol. 2, No. 4.*

* cited by examiner

Primary Examiner—Reba I. Elmore
Assistant Examiner—Sheela S. Rao
(74) Attorney, Agent, or Firm—Bever, Hoffman & Harms, LLP; Jeanette S. Harms (57) ABSTRACT

In an IC chip, a novel precomputation architecture and process which grants improved reductions in power dissipation, requires less logic to implement, and relaxes critical timing constraints. A first computation circuit is used to calculate output values if precomputation cannot be performed. However, if the output values can be precomputed, a second circuit is used to calculate the output values. The second computation circuit is smaller, simpler, and consumes less power than the first computation circuit. An extremely small and simple decision circuit, which dissipates a minimal amount of power, is used to determine whether precomputation is possible. This determination is made at a previous cycle, whereas the actual computation of the output cycles are postponed to be performed in a subsequent cycle. Depending on whether precomputation can be performed, either the first computation circuit or the second computation circuit is activated while the unused computation circuit is disabled in order to conserve power. The decision circuit also directs a multiplexer to select output values generated by either the first computation circuit or the second computation circuit.

13 Claims, 9 Drawing Sheets

APPARATUS AND METHOD FOR IMPROVED PRECOMPUTATION TO MINIMIZE POWER DISSIPATION OF INTEGRATED CIRCUITS

FIELD OF THE INVENTION

The present invention pertains to an improved precomputation logic and method for minimizing power dissipation of integrated circuits.

BACKGROUND OF THE INVENTION

Integrated circuit (IC) semiconductor chips are found in virtually every conceivable electronic device ranging from consumer products to office equipment, telecommunications gear, all sorts of instrumentation, etc. With rapid advances in semiconductor technology, ever increasing numbers of transistors can be fitted onto a single IC chip. Logic density has reached the point where a single IC chip today is capable of containing upwards of millions of transistors. Indeed, the processing power and versatility of these IC chips keep increasing while manufacturing costs keep decreasing. These trends coupled with constant improvements in miniaturization, have made it feasible and practical to develop highly sophisticated portable electronic products. Portable products, such as laptop computers, cellular telephones, etc. are in great demand by today's highly mobile professionals. Other battery operated electronic devices include radios, televisions, electronic games, calculators, tape recorders, CD players, pagers, and even satellites.

The major problem that all of these battery operated devices face is the inevitable fact that they must eventually shut down when their batteries expire. In an effort to extend the operating time of these portable devices, designers have resorted to incorporating additional batteries, utilizing exotic batteries having greater capacities, and reducing the number of IC chips. Each of these solutions has its disadvantages. Additional batteries make the portable devices heavier, bulkier, more cumbersome. Exotic batteries are prohibitively expensive. And reducing the amount of chips limits the device's functionality and versatility.

One solution which does not have these attendant disadvantages relates to "precomputation." Precomputation refers to the art of incorporating specialized additional circuits which attempt to forecast or anticipate the output logic values of a more complex, standard circuit. By analyzing the functions of the standard circuit, it may be possible to predict the circuit's output values with 100% accuracy under certain sets of input conditions. The precomputation circuit detects these input conditions and generates the output values ahead of time. It is these precomputed output values which are subsequently used. The goal is to recognize and exploit the existence of simpler precomputation functions. In those instances whereby output logic values can be precomputed, the more complex, standard circuit need not generate its standard output values and, hence, can be disabled. Because the precomputation circuit is smaller and simpler than that of the standard circuit, it consumes less power. Thus, a significant amount of power can be conserved by running the simpler precomputation circuit while shutting down the more complex and power-draining standard circuit. For some circuits, it is possible to achieve 75% reductions in average power dissipation by using precomputation. Another benefit conferred by precomputation is that, by reducing power dissipation, it also helps reduce the heat generated by an IC chip. Heat buildup limits the speed at which an IC chip can run and can shorten its life span. Hence, precomputation is very beneficial.

Figure 1:
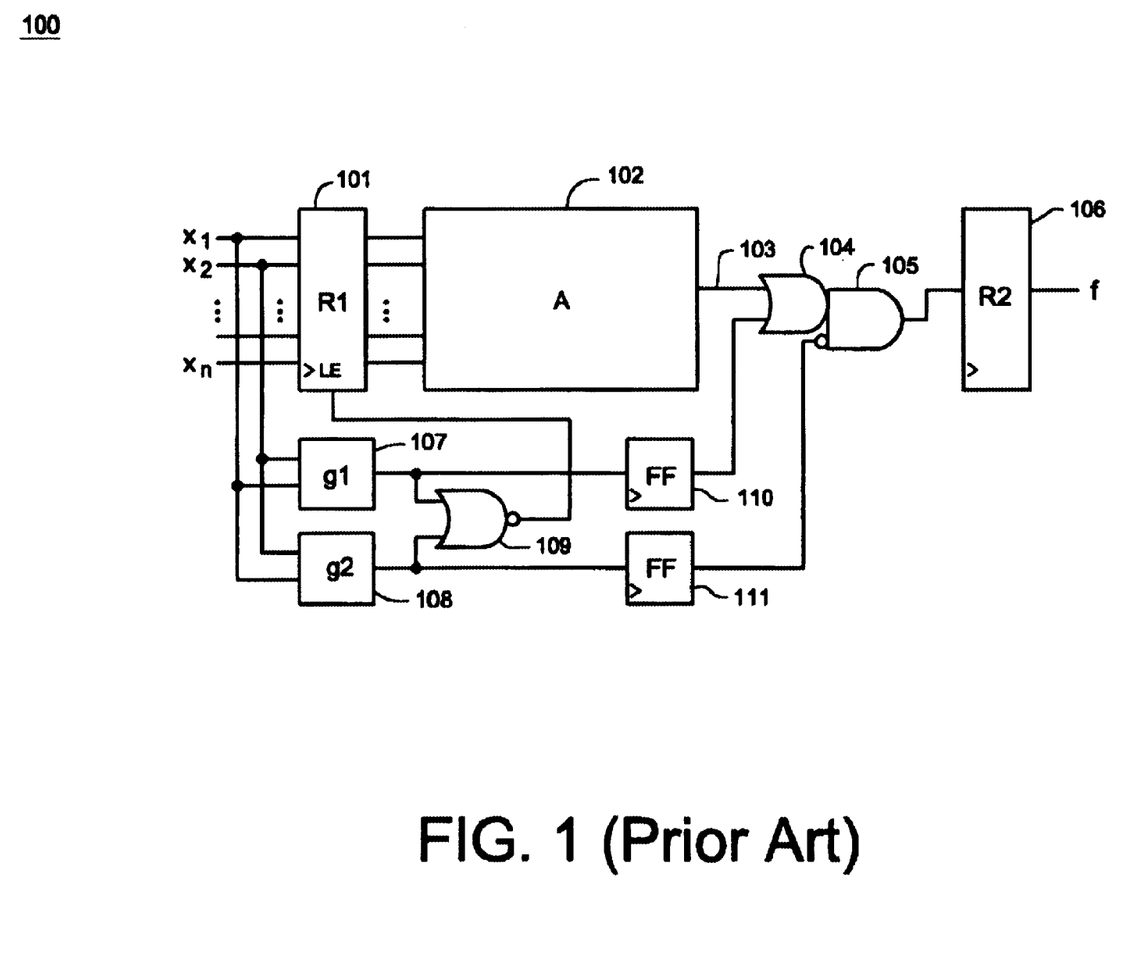
FIG. 1 shows a typical prior art precomputation architecture.
Figure 2:
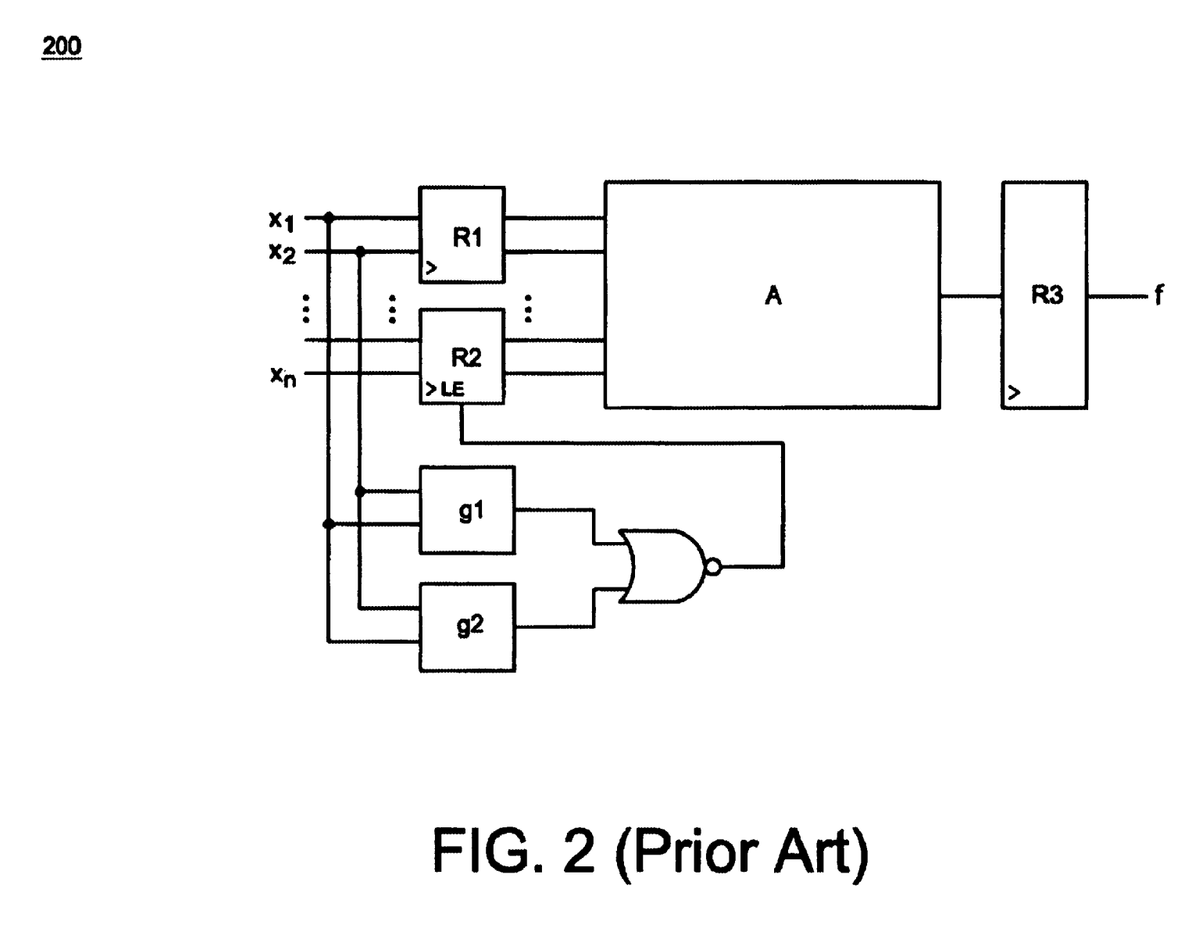
FIG. 2 shows another prior art precomputation architecture.
Figure 3:
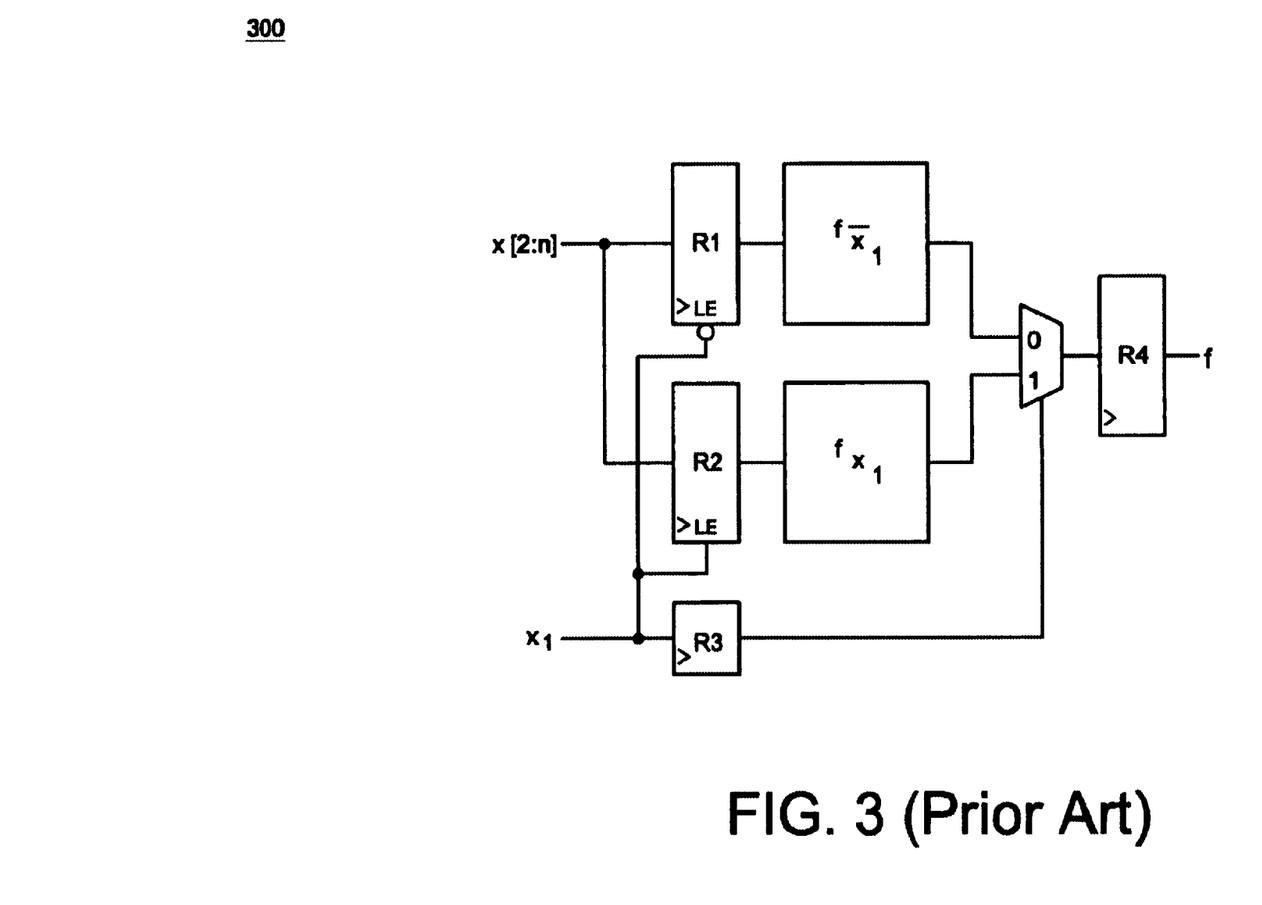
FIG. 3 shows yet another prior art precomputation architecture.

There exist many different architectures for implementing the precomputation circuit. An article by Mazhar Alidina, Jose Monteiro, Srinivas Devadas, *Precomputation-Based sequential Logic Optimization for Low Power*, IEEE Transactions on Very Large Scale Integration Systems, Vol. 2, No. 4, December 1994, describes several precomputation architectures. As an example, FIG. 1 shows a typical prior art precomputation architecture. Register 101 is used to load the $x_1$–$x_n$ input values to standard circuit 102. If precomputation is not possible, then the output value on line 103 from standard circuit 102 is fed via OR gate 104 and AND gate 105 to register 106 corresponding to a subsequent pipeline section. In this case, precomputation does not offer any savings in the power dissipation. On the contrary, the additional precomputation circuitry 107-111 actually causes power dissipation to increase. However, if $x_1$ and $x_2$ are such that precomputation is successful, then NOR gate 109 sends a load enable (LE) signal to disable register 101. This prevents any transitions being input to standard circuit 102. Consequently, standard circuit 102 does not dissipate any power. The g1 block 107 represents the case where an output value of "1" is precomputed. Flip-flop 110 latches this value and forces OR gate 104 to also output a "1." Thereby, a value of "1" is driven as an input to register 106, regardless and independent of whatever the output is from standard circuit 102 since it is assumed that g1 and g2 can never be "1" at the same time. Similarly, the g2 block 108 represents the case where an output value of "0" is precomputed. Flip-flop 111 latches this value and forces AND gate 105 to drive a "0" as an input to register 106, regardless and independent of whatever the output is from standard circuit 102. In these cases, power dissipation is minimized because standard circuit 102 is effectively shut down. Other prior art precomputation architectures are depicted in FIGS. 2 and 3.

Although these prior art precomputation architectures help reduce power dissipation, it would be preferable if there were some better way to achieve even greater power conservation. The present invention offers an improved precomputation architecture and method which results in less power dissipation, takes less circuitry to implement, and has less time delay.

SUMMARY OF THE INVENTION

The present invention pertains to a novel precomputation architecture and process for use in IC chips, which grants improved reductions in power dissipation, requires less logic to implement, and relaxes critical timing constraints. The functions performed by an original, standard circuit is replaced by two or more mutually exclusive circuits "A" and "B." Circuit "A" is used to calculate output values if precomputation cannot be performed. However, if the output values can be precomputed, the precomputation circuit "B" is used to calculate the output values. Precomputation circuit "B" is smaller, simpler, and consumes less power than precomputation circuit "A". Hence, whenever the appropriate set of input signals are in a condition such that precomputation can be performed, power is conserved by using the simpler circuit "B" rather than the more complex circuit "A" to calculate the final output values. An extremely small and simple decision circuit is used to determine whether precomputation is possible. Depending on whether precomputation can be performed, either circuit "A" or circuit "B" is activated. They are never both activated at the same time. Only one or the other circuit is active while the unused circuit is disabled in order to conserve power. The decision circuit directs a multiplexer to select the appropriate output values generated by either circuit "A" or "B" as the case may be.

In the present invention, the decision circuit merely selects either circuit "A" or "B" based on its determination of whether precomputation is possible. It renders its selection at a previous cycle. The actual computation of the output values is made by either circuit "A" or circuit "B" in a subsequent cycle(s). In contrast, prior art precomputation circuits determine whether precomputation is feasible and also calculate the final output values. In the prior art, both of these functions are performed in the previous cycle. However, the present inventors have discovered that one only needs to determine whether precomputation is possible in the previous cycle. The actual computation of the final output values can be postponed until a subsequent cycle. This novel concept offers several advantages. Namely, with the present invention, only the decision circuit is continuously kept activated. This is in direct contrast to the prior art, whereby the entire precomputation circuitry is continuously kept active. Since the decision circuit performs the single function of precomputation detection, it draws less power than prior art precomputation functions which perform both functions of precomputation detection and output value generation. Furthermore, postponing the actual computation of the output values until subsequent cycle relaxes critical timing constraints. In addition, less transistor logic is required to implement the decision circuit as opposed to traditional precomputation circuits.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An improved precomputation architecture and method for reducing power dissipation in IC chips is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 4:
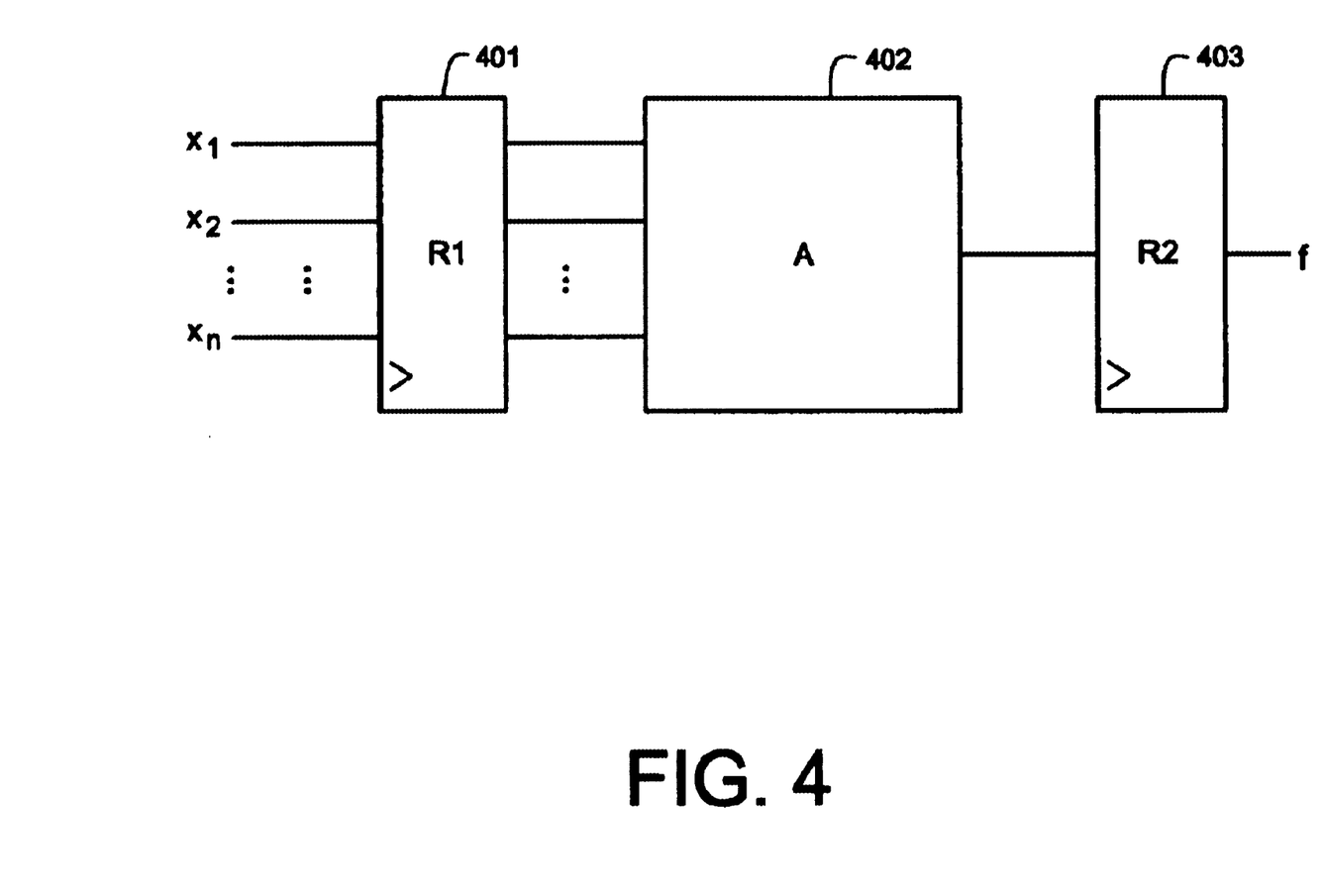
FIG. 4 shows a block diagram of one exemplary pipeline stage upon which precomputation can be practiced.

Referring to FIG. 4, a block diagram of one exemplary pipeline stage upon which precomputation can be practiced is shown. A number of input signals $x_1$–$x_n$ are fed into register 401. Standard circuit 402 processes the signals from register 401. The output values from standard circuit 402 is passed on to a subsequent pipeline stage (i.e., register 403 followed by another set of circuits). There may be several consecutive pipeline stages comprised of register/circuit combinations. For each of these stages, precomputation circuitry may be added to reduce the overall power dissipation as follows.

Figure 5:
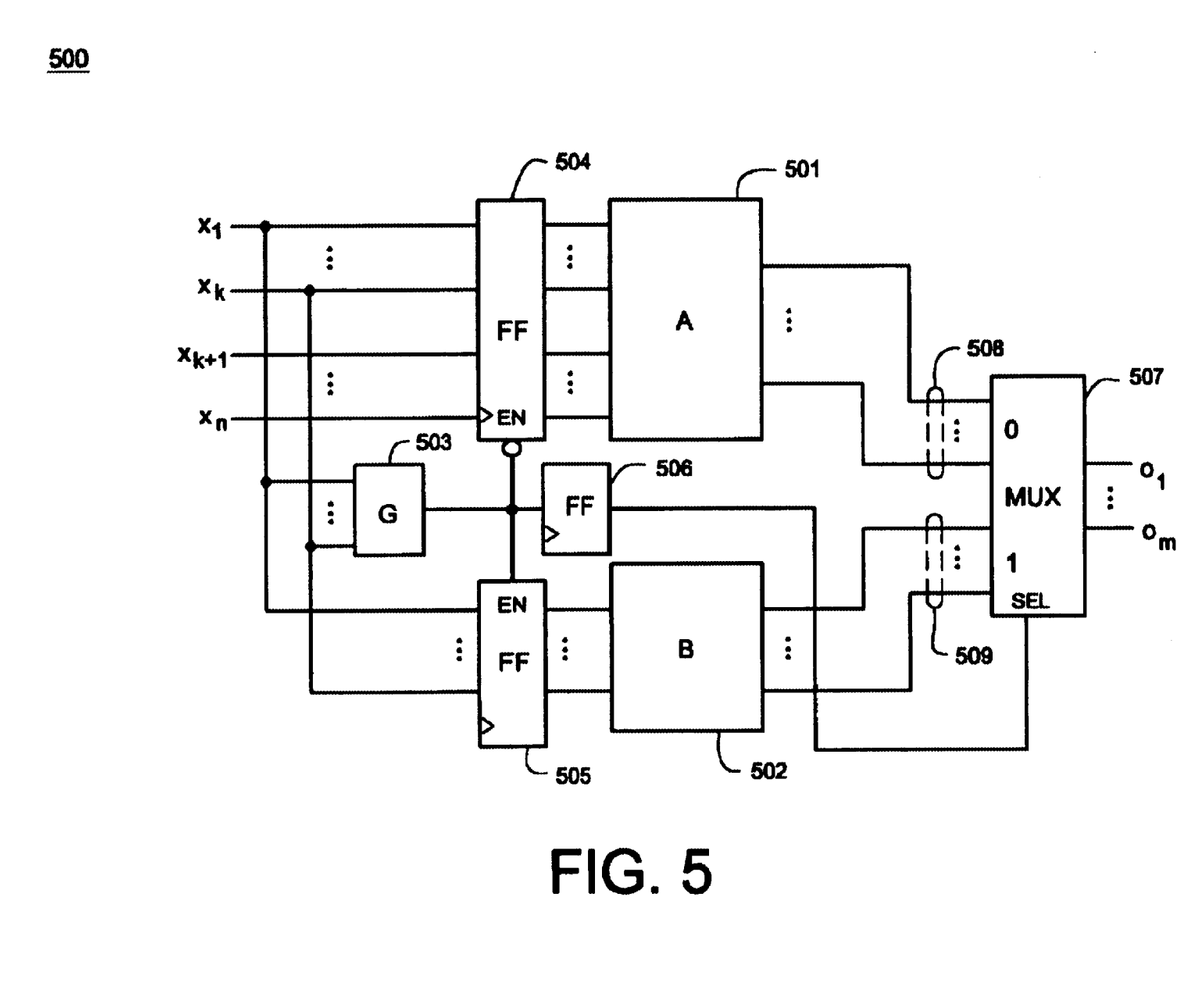
FIG. 5 shows a novel precomputation architecture according to the currently preferred embodiment of the present invention.

FIG. 5 shows a novel precomputation architecture according to the currently preferred embodiment of the present invention. This precomputation architecture may be used to reduce the power dissipation of standard pipeline stages. Furthermore, it can also be used in any number of situations for reducing the power dissipation of simple combinational logic to entire blocks of circuitry, state machines, etc. Moreover, the present invention is useful in very large scale integration (VLSI), complementary metal oxide silicon (CMOS), gallium arsenide (GaAs), etc., technologies. In addition, the present invention can be applied to microprocessors, digital signal processors, converters, application specific integrated circuits (ASICs), state machines, programmable logic, and various digital engines.

The precomputation architecture of the present invention is distinguished from all other precomputation architectures by the fact that it partitions the original, standard circuit into two separate circuits (e.g., block "A" 501 and block "B" 502). These two new circuits 501 and 502 are used in place of the standard circuit. Together, they perform the exact same functions as that of the original, standard circuit. Although the combination of each of the two new circuits 501 and 502 is larger than that of the standard circuit, individually they are each smaller and simpler than the original, standard circuit. Now, instead of either totally enabling or disabling the standard circuit, the present invention selectively chooses one of these two circuits 501 or 502 to turn on. A much simpler and smaller decision "g" circuit 503 is used to determine which of these two new circuits 501 or 502 is to be enabled. Consequently, only one of the two new circuits is active at any given time. Whichever circuit is active at the time, is used to perform the actual computation of the final output value. Since either of the two new circuits 501 or 502 is simpler and smaller than the original, standard circuit, it dissipates less power.

The actual mode of operation of the novel precomputation architecture is now described in detail. First, a number of input signals $x_1$–$x_k$ and $x_{k+1}$–$x_n$ are fed into flip-flop 504. Flip-flop 504 is used to clock these input signals to the first circuit 501. A subset (e.g., $x_1$–$x_k$) of the total input signals is also fed into a second flip-flop 505. Flip-flop 505 is used to clock this subset of input signals to the second circuit 502. Circuit 502 is independent, separate, and different from that of circuit 501. Another subset of input signals which is generally a subset of ($x_1$–$x_k$) (i.e., it can be the same, but it can also be a proper subset,) is input to decision circuit 503. Based on this subset of input signals, decision circuit 503 controls the enables (EN) of flip-flops 504 and 505. The enable of flip-flop 504 is inverted from that of the enable of flip-flop 505. This ensures that only one of these two flip-flops 504–505 is enabled at any given time. Decision circuit 503 determines whether precomputation is possible. It does not perform the actual precomputation calculations for generating a final output value. This is different from prior art precomputation circuits which typically not only determine whether precomputation is possible, but also generate the requisite precomputation output values. In contrast, the decision block 503 merely enables flip-flop 504 if precomputation is not possible. This causes circuit 501 to become active. It is the function of circuit 501 to perform the actual calculations for generating the final output values. Otherwise, if precomputation is possible, decision circuit 503 enables flip-flop 505. This causes circuit 502 to become active. In turn, circuit 502 performs the requisite calculations for generating the output precomputation values. Output values from both circuits 501 and 502 are fed into a multiplexer 507. The multiplexer 507 selects output values from either circuit 501 or 502 under the control of the decision circuit 503 via flip-flop 506. If decision circuit enables flip-flop 504, then it latches flip-flop 506 so that multiplexer 507 selects the output values on lines 508 from circuit 501.

Otherwise, if decision circuit enables flip-flop 505, then it latches flip-flop 506 so that multiplexer 507 selects the output values on lines 509 from circuit 502. The final output values $O_1$–$O_m$ are then sent on to be used by subsequent circuit. The presence of the decision logic enables the optimization of block A and B:

Whenever G is one block A is disabled. Thus, all input values for which G=1 are "Don't Care" conditions for A. We can use this information to optimize the logic in A, possibly reducing the number of inputs to block A, and further save power. A similar reasoning applies to block B, with the difference being that input values for which G=0 are Don't Care for B. While the optimization of A using G=1 as Don't Care was possible in the previous art as well, the optimization of B with G=0 as Don't Care is possible only in the current invention.

There are several advantages to performing the precomputation according to the present invention over that of the prior art. Namely, in the prior art, the entire precomputation circuit along with the standard circuit (e.g., g1, g2, and block A of FIG. 1) are typically always active and, hence, drawing power. In contrast, the present invention only activates one of the two mutually exclusive circuits 501 or 502 and the decision block 503. Hence, less power is consumed. Also, as discussed above, prior art precomputation circuits typically determined whether precomputation is possible and also did the actual calculations for generating the final output values. However, the present inventors discovered that it is not necessary to perform both of these tasks in a previous clock cycle. Instead, the inventors conceived of the idea that it is possible and more beneficial to just perform the determination of whether precomputation is possible in the previous clock cycle. One embodiment of this unique concept is to implement a dedicated decision circuit for performing this sole task. By postponing the actual precomputation, the task of the decision circuit is made much simpler. Consequently, the decision circuit is much smaller and less complex; and hence, it draws less power. Moreover, it consumes less logic to implement.

Another important advantage is that, due to its simplicity, timing constraints are relaxed. It takes less time to render a simple decision than to do the calculations associated with the actual precomputation process. Furthermore, the present invention minimizes the number of flip-flops that are required. In most prior art precomputation designs, at least one or perhaps even two flip-flops are required for each output. But with the precomputation designs associated with the present invention, there is just one flip-flop corresponding to each input. Since the goal of precomputation is to simplify the overall circuitry, there will often be less inputs than outputs. As a result, there will be less flip-flops used with the present invention. Therefore, precomputation designs associated with the present invention require less transistors to implement, have improved timing constraints, and dissipates less power.

Figure 6:
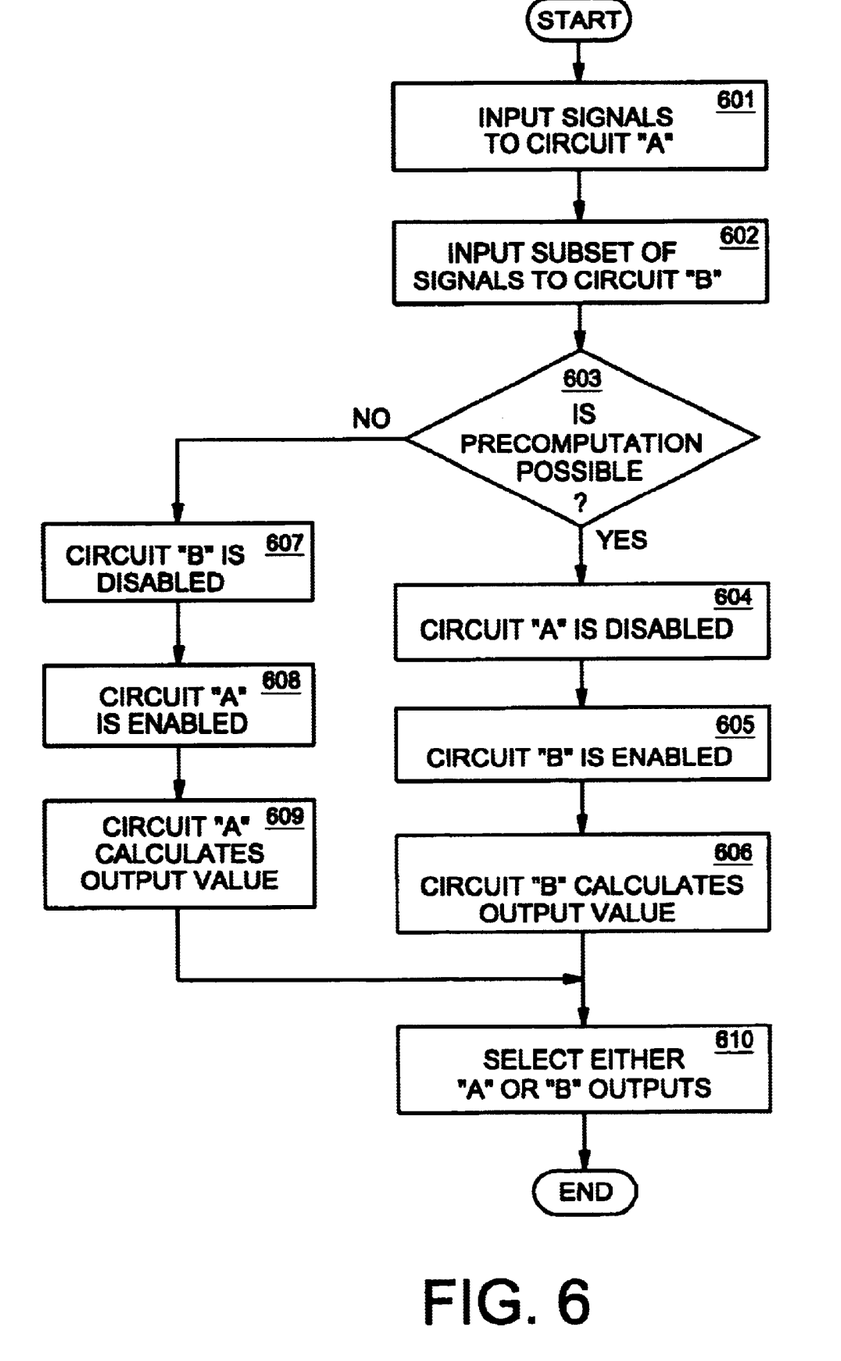
FIG. 6 is a flowchart describing the steps for performing the precomputation process according to the present invention.

FIG. 6 is a flowchart describing the steps for performing the precomputation process according to the present invention. Initially, in steps 601 and 602, a standard circuit is divided into two or more circuits "A" and "B." The standard circuit may be broken into additional circuits C, D, E, etc. Next, step 603 determines whether precomputation is possible. This step 603 is performed in a previous cycle. If precomputation is possible, steps 604–606 are performed. In step 604, the more complex circuit "A" is disabled so that it does not dissipate any power. Thereupon, the simpler circuit "B" is enabled, step 605. Circuit "B" does the actual precomputation calculation to determine the final output value, step 606. Otherwise, if it is determined in step 603 that precomputation is not possible, then steps 607–609 are performed instead. In step 607, since precomputation is not possible, the simpler circuit "B" is disabled. Circuit "A" is enabled and it calculates the final output values, steps 608 and 609. In the last step 610, a multiplexer or equivalent logic is used to appropriately select either the output values generated by circuit "A" or circuit "B."

Figure 7A:
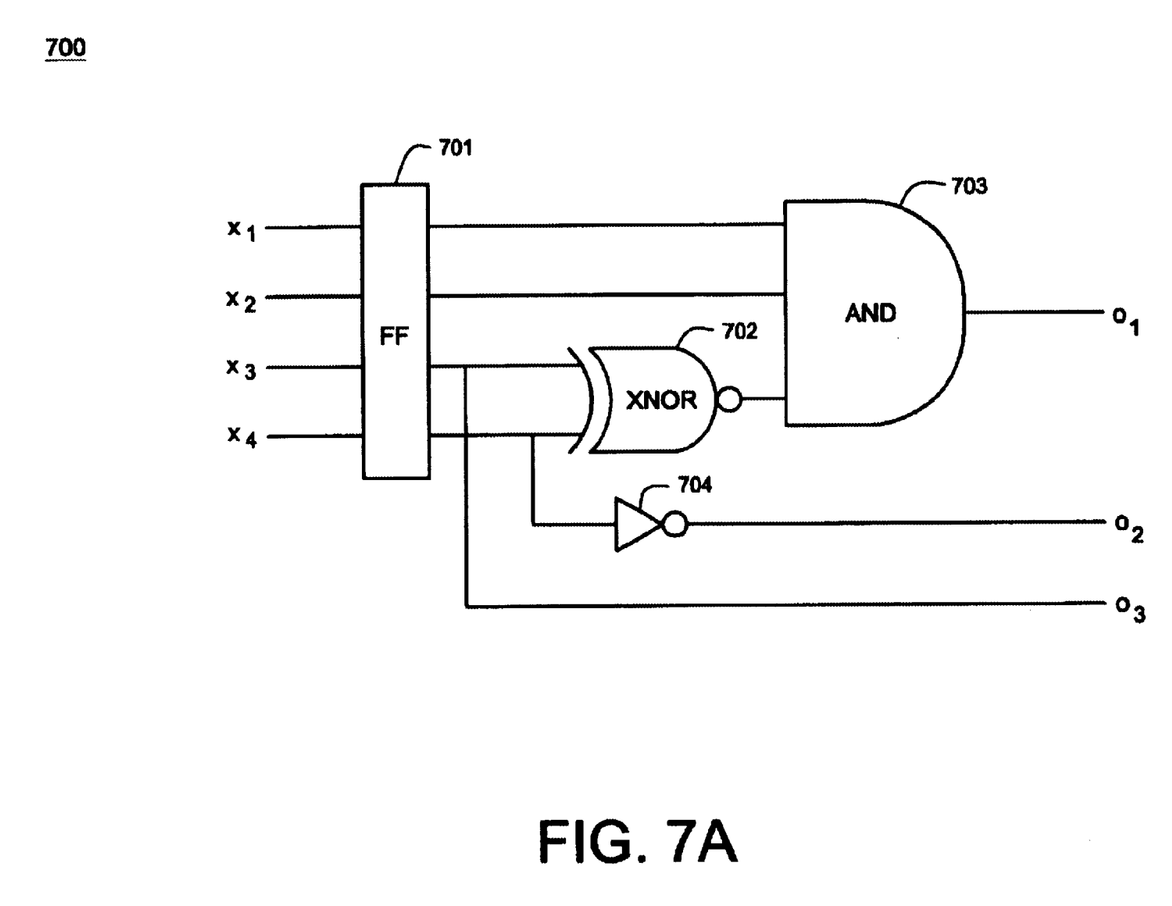
FIG. 7A shows an example of an original, standard circuit comprised of a register, an XNOR gate, an AND gate, and an inverter.
Figure 7B:
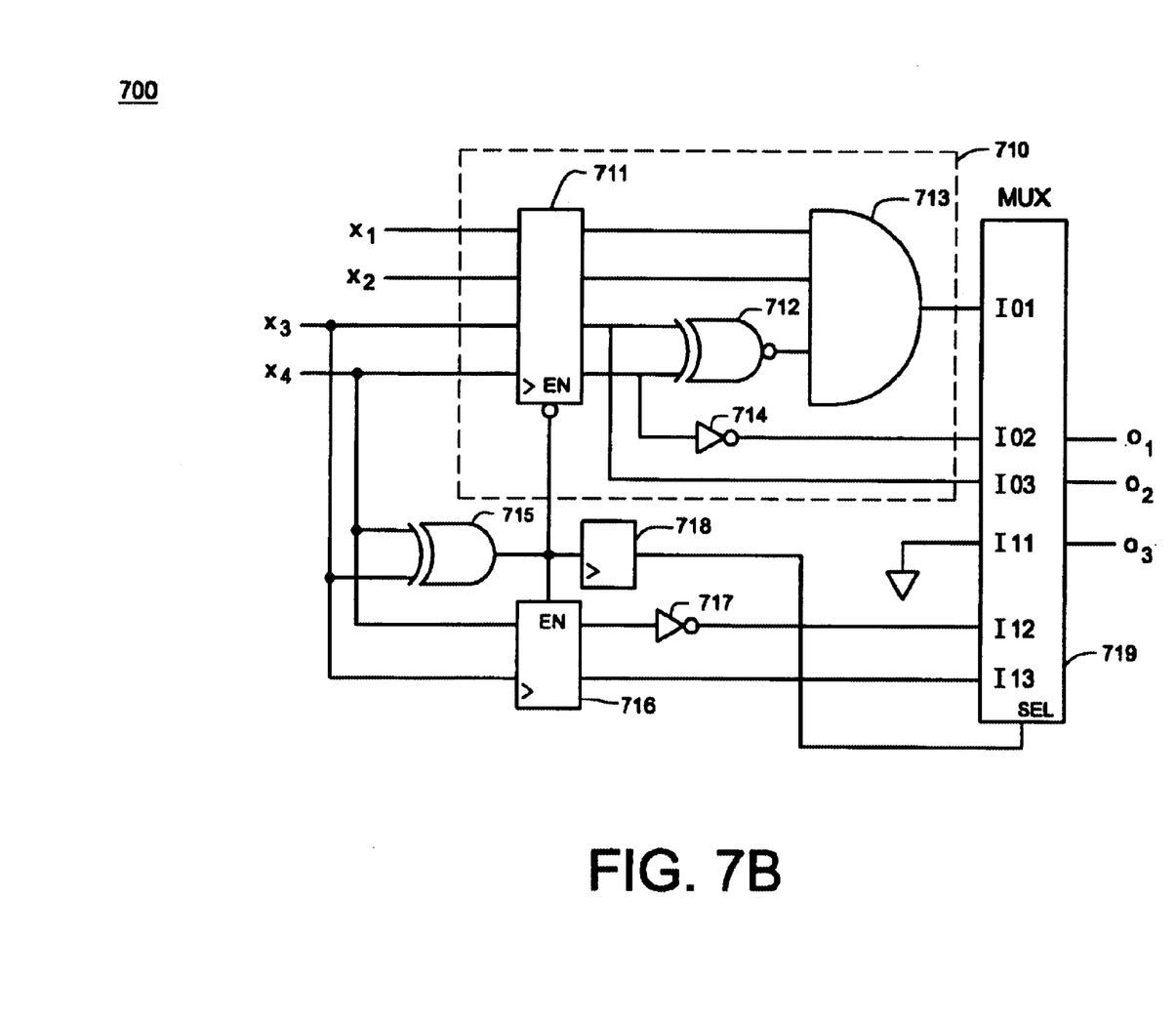
FIG. 7B shows a circuit that allows for the precomputation of the input signals of the circuit shown in FIG. 7A.

FIGS. 7A and 7B show an exemplary application of how the precomputation architecture and process of the present invention may be applied. FIG. 7A gives an example of an original, standard circuit comprised of register 701, XNOR gate 702, AND gate 703, and inverter 704. A number of inputs $X_{1-X4}$ are input to register 701. The $X_3$ signal is directly output as $O_3$. The $X_4$ signal is inverted and output as O2. The $X_3$ and $X_4$ signals are input to XNOR gate 702. The output from XNOR gate 702 along with the $X_1$ and $X_2$ signals are input to AND gate 703. The output from AND gate 703 is given as $O_1$.

FIG. 7B shows a circuit that allows for the precomputation of the X3 and X4 input signals of the circuit shown in FIG. 7A. The precomputation is calculated as follows:

$$G=(\forall x_1 x_2 O_1 + \forall x_1 x_2 O_1')(\forall x_1 x_2 O_2 + \forall x_1 x_2 O_2')(\forall x_1 x_2 O_3 + \forall x_1 x_2 O_3')= x_3 x'_4 + x'_3 x_4$$

Basically, the X1–X4 signals are input to a duplicate copy of the standard circuit comprised of register 711, XNOR gate 712, AND gate 713, and inverter 714. The outputs from the standard circuit 710 are input as I01–I03 of multiplexer 719. A subset, $X_3$ and $X_4$, of the input signals are fed into the decision circuit and also into register 716. In this particular example, the decision circuit is comprised of an XOR gate 715. Whenever the XOR of $X_3$ and $X_4$ is "low" (e.g., $X_3$=0 and $X_4$=0; or $X_3$=1 and $X_4$=1), this indicates that the precomputation of $X_3$ and $X_4$ is not possible. In this case, register 711 is enabled to cause the original standard circuit 710 to become activated. However, whenever the XOR of $X_3$ and $X_4$ outputs a "high" value (e.g., $X_3$=0 and $X_4$=1; or $X_3$=1 and $X_4$=0), this indicates that the precomputation of $X_3$ and $X_4$ is possible. Thereby, register 716 is enabled to activate the precomputation circuitry. In this example, the precomputation circuit is comprised of inverter 717. The X3 signal is inverted and input to multiplexer 719 as I12. The I11 input to multiplexer 719 is grounded; and the X4 signal is directly passed on to multiplexer 719 as I13. Decision circuit 715 controls multiplexer 719 so that it selects the I01–I03 signals for the final output values, $O_1$–$O_3$, if the precomputation of $X_3$ and $X_4$ is not possible. Otherwise, decision circuit 715 informs multiplexer 719 to output the I11–I13 values whenever the precomputation of $X_3$ and $X_4$ is possible.

A discussion of how the precomputation architecture and process of the present invention is differentiated from that of the prior art is now offered. First, the prior art precomputation circuit shown in FIG. 1 is compared against the present invention depicted in FIG. 5. The main difference is that the logic block "B" of the present invention, which computes the outputs O1–Om when G=1, is disabled when G=0. Moreover, the computation of block "B" is performed in the clock cycle following the computation of "G." It is not possible to transform the prior art architecture to the architecture of the present invention with straightforward transformations such as retiming and/or combinational logic optimization. This is due to the fact that in the architecture of the present invention, the flip-flop at the input of circuit "B" is conditionally disabled by the decision circuit "G," whereas the bottom flip-flops 110–111 of the prior art is continuously enabled. Next, the prior art shown in FIG. 2 is compared against the present invention. One main difference is that the present invention allows the complete shutdown of circuit "A." In contrast, the prior art architecture is designed only for a partial shutdown of its corresponding circuit "A." Moreover, the architecture of the present invention contains circuit block "B" with output multiplexing. The prior art contains only the additional activation function of the inverse of (g1+g2) that disables the clock of some flip-flops at the input of their circuit "A." Lastly, the prior art of FIG. 3 is compared against the present invention. The main difference between the precomputation architecture of FIG. 3 and the precomputation of the present invention is in the nature of the function used to select which block to disable (i.e., the activation function). Whereas the prior art architecture and its obvious generalizations may produce activation functions with functional form equal to h-way logic products, the formulation of the present invention allows activation functions with a general functional description. The equations representing the activation functions are given below.

Present Invention $$G = \prod_{i=1}^{m} (\forall x_{K+1...}x_n A_i(x_1 ... x_n) + \forall x_{K+1...}x_n A_i'(x_1 ... x_n))$$

Prior Art $$G = \sum_{i=1}^{h} x_i = p_i$$

Transforming these two equations into canonical sum of product form yields a single product for the previous art versus a sum of products $$G = \sum_{i=1}^{N_{cube}} p_i$$

for the present invention. A general sum of products cannot in general be transformed into a single cube and vice versa. Thus, the two architectures are not equivalent in general.

Figure 8:
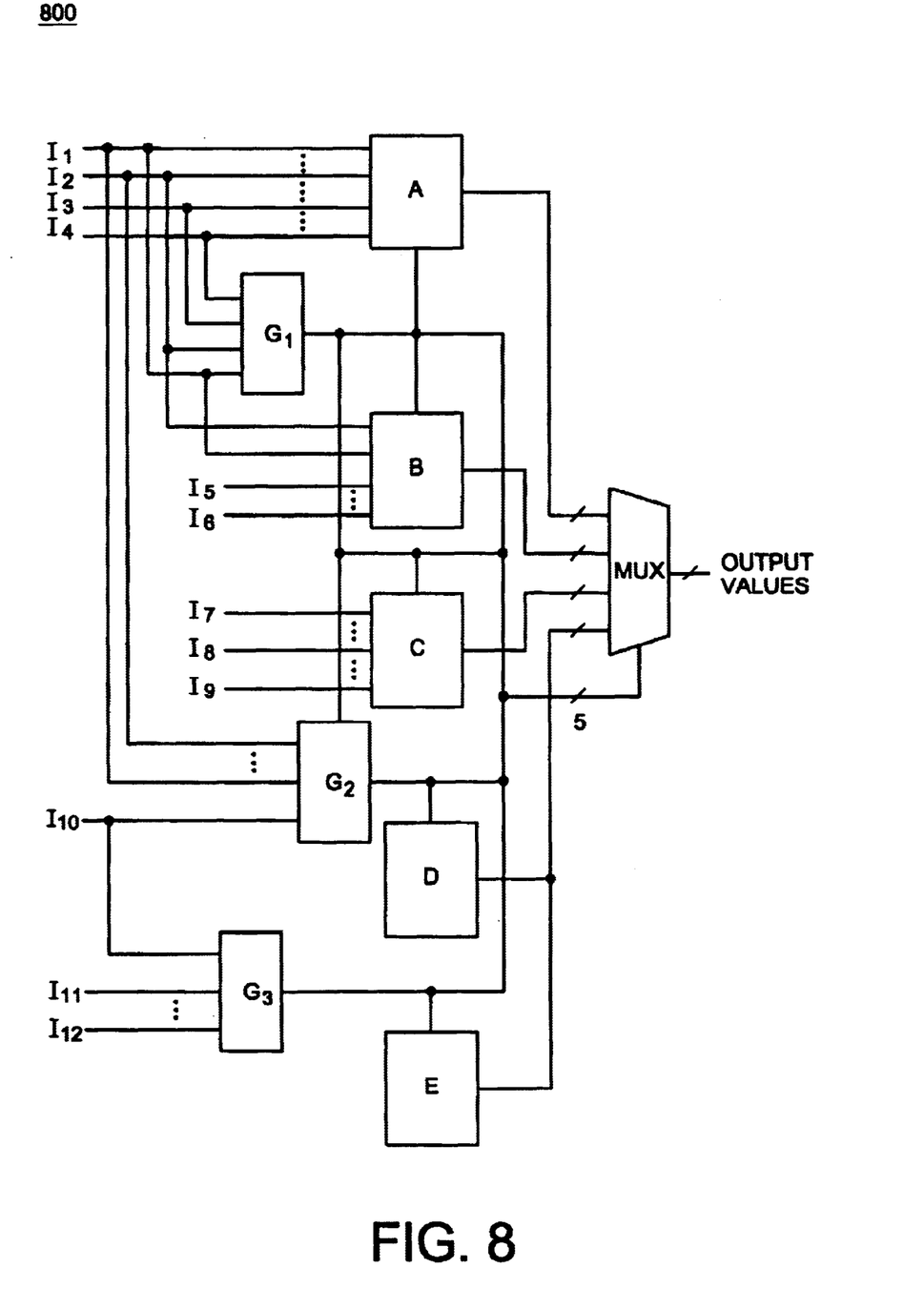
FIG. 8 shows some alternative embodiments for the precomputation architecture of the present invention.

FIG. 8 shows some alternative embodiments for the precomputation architecture of the present invention. It can be seen that the decision circuit is capable of controlling multiple precomputation circuits. For example, the G decision circuit is used to control N precomputation circuits A–N. The input variables to the various decision circuits can be fully overlapping, partially overlapping, or totally non-overlapping. Furthermore, wires input to one of the precomputation circuits might not be input to a different precomputation circuit. Whereas, the other precomputation circuit might include independent and disjointed wire(s). Moreover, the output from one decision circuit might be used as an input or control signal to another decision circuit. Yet another arrangement that is within the scope of the present invention is to cascade several decision/precomputation circuits. The outputs from the decision circuits are used to control one or more multiplexers. The multiplexers may choose to select any subset of its input signals for output.

It should be noted, however, that the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for minimizing power dissipation in a semiconductor device, comprising:

a first register for accepting a plurality of input signals;

a first computation circuit coupled to the first register for computing output signals according to the plurality of input signals;

a second register for accepting at least one of the input signals;

a pre-computation circuit coupled to the second register for computing a pre-determined output signal if a pre-determined set of input signals is detected and wherein the second computation circuit is smaller and has less logic than the first computation circuit;

a decision circuit coupled to the second register which determines whether it is possible to perform precomputation, wherein if precomputation is possible, the decision circuit causes the first register to be disabled which deactivates the first computation circuit while the second register is enabled and the pre-computation circuit generates the pre-determined output signal and wherein if precomputation is not possible, the second register is disabled which deactivates the pre-computation circuit while the first register is enabled such that the first computation circuit generates the output signals.

2. The apparatus of claim 1 further comprising a multiplexer coupled to the first computation circuit, the pre-computation circuit, and the decision circuit for selecting output values either generated by the first computation circuit or the pre-computation circuit under control of the decision circuit.

3. The apparatus of claim 1, wherein the decision circuit renders its determination of whether it is possible to perform precomputation before pre-computation is performed by the pre-computation circuit.

4. The apparatus of claim 3, wherein the first computation circuit performs computation of the output value after the decision circuit has determined that precomputation is not possible with a given set of input signals.

5. The apparatus of claim 3, wherein the pre-computation circuit performs computation of the output value after the decision circuit has determined that precomputation is possible.

6. The apparatus of claim 1 further comprising a second pre-computation circuit coupled to the decision circuit for generating output values.

7. The apparatus of claim 1 further comprising a second decision circuit for determining whether precomputation can be performed on a second set of input signals.

8. In a circuit, a method for precomputing output values, comprising the steps of:

determining whether precomputation is possible, wherein
if precomputation is not possible:
   enabling a first circuit which is used to generate output values when precomputation is not possible;
   disabling a second circuit which is used to generate output values when precomputation is possible;
   generating the output values by the first circuit;
   selecting the output values which were generated by the first circuit;
and wherein if precomputation is possible:
   disabling the first circuit;
   enabling the second circuit;
   generating the output values by using the second circuit;
   selecting the output values which were generated by the second circuit.

9. The method of claim 8 wherein the step of determining whether precomputation is possible is performed before the actual computation of output values by the first or second circuit is performed in a subsequent cycle.

10. The method of claim 8 further comprising the steps of:
generating output values from three or more circuits;
determining whether precomputation is possible for which ones of three or more circuits.

11. The method of claim 8 further comprising the step of performing a second determination of whether precomputation is possible.

12. An apparatus comprising:
   a first register for accepting a plurality of input signals for processing;
   a first computation circuit coupled to the first register which calculates output values if precomputation cannot be performed;
   a second register for accepting a subset of the input signals;
   a second computation circuit coupled to the second register which calculates output values if precomputation can be performed;
   logic coupled to the first register and the second register for determining whether precomputation can be performed, wherein the determination is made at a previous cycle and the calculation of output values by either the first computation circuit or the second computation circuit is made in a subsequent cycle;
   a selection circuit coupled to the first and second computation circuits, wherein the selection circuit under control of the logic selects output values generated by either the first computation circuit or the second computation circuit.

13. A method for generating processing input signals and generating an output signal, comprising the steps of:
   determining whether precomputation is possible in a first clock;
   enabling a first circuit which is used to generate the output signal if precomputation is not possible, wherein the first circuit generates the output signal in a second clock;
   disabling a pre-computation circuit if precomputation is not possible;
   disabling the first circuit if precomputation is possible;
   enabling the pre-computation circuit if precomputation is possible, wherein the pre-computation circuit generates the output signal in the second clock.

* * * * *